United States Patent
Son

(10) Patent No.: US 8,035,736 B2
(45) Date of Patent: Oct. 11, 2011

(54) GRIP DEVICE AND IMAGE PHOTOGRAPHING APPARATUS HAVING THE SAME

(75) Inventor: Hyeong-sam Son, Suwon-si (KR)

(73) Assignee: Samsung Electronics Co., Ltd, Suwon-Si (KR)

( * ) Notice: Subject to any disclaimer, the term of this patent is extended or adjusted under 35 U.S.C. 154(b) by 783 days.

(21) Appl. No.: 11/970,078

(22) Filed: Jan. 7, 2008

(65) Prior Publication Data

US 2009/0003821 A1    Jan. 1, 2009

(30) Foreign Application Priority Data

Jun. 27, 2007    (KR) .................... 10-2007-0063974

(51) Int. Cl.
*H04N 5/225*    (2006.01)
(52) U.S. Cl. ....................................... 348/376; 348/373
(58) Field of Classification Search ..... 348/207.99–376; 386/118; D16/206, 211–213; 352/243; 396/419–424, 428, 535, 540
See application file for complete search history.

(56) References Cited

U.S. PATENT DOCUMENTS

| | | | | |
|---|---|---|---|---|
| 4,494,147 A * | 1/1985 | Komine | .................... | 348/341 |
| 4,959,729 A * | 9/1990 | Fukuda et al. | ................. | 348/375 |
| 5,043,822 A * | 8/1991 | Ichiyoshi et al. | ............. | 348/376 |
| 7,192,204 B2 * | 3/2007 | Koide et al. | ................... | 396/423 |
| 7,474,353 B2 * | 1/2009 | Morinaga | ..................... | 348/373 |
| 7,477,318 B2 * | 1/2009 | Nakamura | .................... | 348/376 |
| 7,619,682 B2 * | 11/2009 | Igarashi | ........................ | 348/373 |
| 2004/0169955 A1 * | 9/2004 | Tsuchida | ..................... | 360/96.5 |
| 2004/0174452 A1 * | 9/2004 | Kinemura et al. | ........ | 348/333.06 |
| 2005/0062880 A1 * | 3/2005 | Kojima et al. | ................ | 348/373 |
| 2005/0174460 A1 * | 8/2005 | Aizawa | ..................... | 348/333.01 |
| 2005/0253959 A1 * | 11/2005 | Nakamura | .................... | 348/373 |
| 2005/0259180 A1 * | 11/2005 | Su et al. | ....................... | 348/375 |
| 2006/0088315 A1 * | 4/2006 | Kappali et al. | ................ | 396/535 |

FOREIGN PATENT DOCUMENTS

| | | |
|---|---|---|
| JP | 03208475 | 9/1991 |
| JP | 2002190974 | 7/2002 |
| JP | 2005-94665 | 4/2005 |
| JP | 2005-592 | 1/2008 |

OTHER PUBLICATIONS

European Search Report issued Oct. 13, 2008 in EP Application No. 08103223.7.

* cited by examiner

*Primary Examiner* — Tuan Ho
*Assistant Examiner* — Kent Wang
(74) *Attorney, Agent, or Firm* — Stanzione & Kim, LLP

(57) ABSTRACT

A grip device and an image photographing apparatus are provided in which a user can photograph an object at any intended angle by freely changing a position of his or her hand while holding the image photographing apparatus. The image photographing apparatus includes a main body including a lens unit to photograph an object, and a button unit to input a plurality of manipulation signals, and a grip device rotatably mounted on one side of the main body. The grip device includes a rotation unit including a grip unit and a connection unit to connect the rotation unit to the main body so that the rotation unit is rotatable about the main body.

28 Claims, 15 Drawing Sheets

GRIP DEVICE AND IMAGE PHOTOGRAPHING APPARATUS HAVING THE SAME

CROSS-REFERENCE TO RELATED APPLICATIONS

This application claims priority under 35 U.S.C. §119 (a) from Korean Patent Application No. 10-2007-0063974, filed on Jun. 27, 2007, in the Korean Intellectual Property Office, the disclosure of which is incorporated herein by reference in its entirety.

BACKGROUND OF THE INVENTION

1. Field of the Invention

The present general inventive concept relates to a grip device and an image photographing apparatus having the grip device.

2. Description of the Related Art

Referring to FIG. 1, a general image photographing apparatus includes a hand grip 2 securely fixed to one side of a main body 1 to wrap the back of a hand so that the image photographing apparatus can be easily held in the hand when capturing images. The main body 1 includes a plurality of buttons 3 disposed at appropriate positions thereof to enable a user to input manipulation signals.

In order to take a high angle shot using the general image photographing apparatus, a user may hold the main body 1 by putting his or her hand H (FIGS. 2A and 2B) inside the hand grip 2 to wrap the back of the hand as illustrated in FIG. 2A.

To change from a high angle shot to a low angle shot, the user needs to remove his or her hand H from the hand grip 2 and then reposition the image photographing apparatus again in order to manipulate the plurality of buttons 3 in a manner suitable for the low angle shot. Conversely, to change from a low angle shot to a high angle shot, the user also needs to remove his or her hand H from the hand grip 2 and then reposition the image photographing apparatus again. As a result, continuous image capture is difficult in order to change the camera position.

SUMMARY OF THE INVENTION

The present general inventive concept provides an image photographing apparatus enabling a user to photograph objects by freely changing the position of his or her hand while holding the image photographing apparatus according to his/her intended angle shot.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept may be achieved by providing an image photographing apparatus including a main body including a lens unit to photograph an object, and a button unit to input a plurality of manipulation signals and a grip device rotatably mounted on one side of the main body.

The grip device may be rotated between a first position and a second position in order to photograph objects at different positions.

The main body may form a cylindrical shape with the grip device.

The grip device may include a rotation unit including a grip unit and a connection unit to connect the rotation unit to the main body so that the rotation unit is rotatable about the main body.

A rotational center of the rotation unit may be in a direction of a user in order not to coincide with a geometrical center of the rotation unit.

Specifically, the rotational center of the rotation unit may lie at a distance of 40±5 mm from a rear side of the main body to a front side of the main body in which the lens unit is mounted.

A rotation angle between the first position and the second position may be in a range of 0° to 150°.

The rotation unit may include a rotation member, and a first rotation casing and a second rotation casing to enclose the rotation member.

The connection unit may include a first connecting member to connect the rotation unit to the main body, and a second connecting member to connect the rotation member to the first connecting member.

The grip device may further include a reinforcing bracket mounted inside the main body, the reinforcing bracket being connected to the first connecting member with the main body disposed therebetween.

The grip device may further include an elastic member mounted between the rotation member and the first connecting member to generate a friction torque.

A mounting hole to mount the first connecting member may be formed in the second rotation casing.

The grip device may further include a stopper unit to restrict a rotation range of the rotation unit with respect to the main body.

The stopper unit may include a first locking projection protruding from the rotation member and a locking jaw disposed on an outer circumference of the second connecting member to correspond to the first locking projection.

The grip device may further include a substopper unit including a second locking projection protruding from the first connecting member and a pair of third locking projections protruding from the rotation member to correspond to the second locking projection.

A plurality of positioning recesses may be provided in the rotation member to correspond to the first and second positions, and a positioning projection may protrude from the elastic member to be inserted into the positioning recesses.

The plurality of positioning recesses may have different radiuses from the rotational center of the rotation member.

The grip unit may include a grip band mounted in the first rotation casing.

The button unit may include a first button unit and a second button unit to input a same manipulation signal at different positions.

A display unit may be mounted in the main body to display video, and the first and second button units may be disposed on the main body and the display unit, respectively.

The foregoing and/or other aspects and utilities of the present general inventive concept may also be achieved by providing an image photographing apparatus including a main body including a lens unit mounted in a front side thereof to photograph an object, and a button unit to input a plurality of manipulation signals, a display unit mounted on one side of the main body to display video, a grip device rotatably mounted in an other side of the main body and a recording medium to record the video.

The main body may form a cylindrical shape with the grip device.

The grip device may be rotated between a first position for a high angle shot and a second position for a low angle shot. A rotation range of the first position may be 0° to 20°, and a rotation range of the second position may be in a range of 130° to 170°.

A guide curved surface to guide the holding of the main body may be provided in an upper side of the main body.

The display unit may include a photographing button to input a capture signal.

The recording medium may include a built-in semiconductor memory mounted in the main body to perform reading and writing operations, and a detachable semiconductor memory detachably mounted in the main body to perform reading and writing operations.

The image photographing apparatus may further include a controller to control a signal exchange between the built-in semiconductor memory and the detachable semiconductor memory.

The foregoing and/or other aspects and utilities of the present general inventive concept may also be achieved by providing an image photographing apparatus including a main body and a grip device rotatably mounted in the main body. A rotational center of the grip device may be eccentric to one side of the main body in order not to coincide with a geometrical center of the main body.

A lens unit may be disposed in a front side of the main body to photograph an object, and the rotational center of the grip device may be eccentric from the geometrical center of the main body toward a rear side of the main body.

The foregoing and/or other aspects and utilities of the present general inventive concept may be achieved by providing a grip device to grip a main body of an image photographing apparatus, the grip device including a rotation unit rotatably mounted on one side of the main body and a connection unit to connect the rotation unit to the main body so that the rotation unit may be rotatable about the main body.

The foregoing and/or other aspects and utilities of the present general inventive concept may also be achieved by providing a grip device rotatably connected to a main body of an image photographing apparatus including a lens unit disposed in a front side thereof, the grip device including a connection unit rotatably connected to the main body and a casing to house the connection unit. A rotational center of the connection unit may be eccentric to a rear side of the main body in order not to coincide with a geometrical center of the main body.

BRIEF DESCRIPTION OF THE DRAWINGS

The above aspects and utilities of the present general inventive concept will be more apparent by describing various embodiments of the present general inventive concept with reference to the accompanying drawings, in which.

DETAILED DESCRIPTION OF THE PREFERRED EMBODIMENTS

Figure 1:
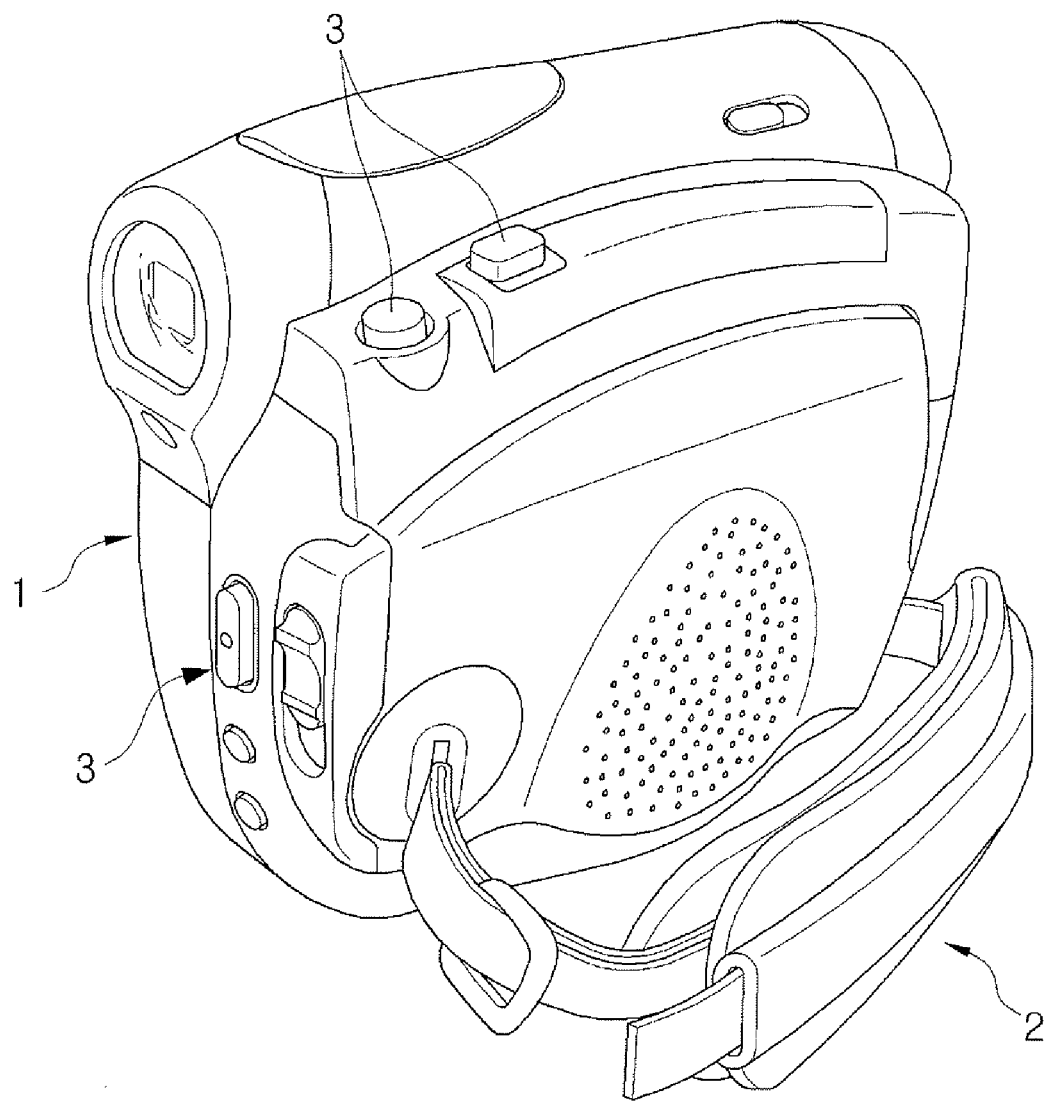
FIG. 1 is a perspective view illustrating a general image photographing apparatus.
Figure 2A:
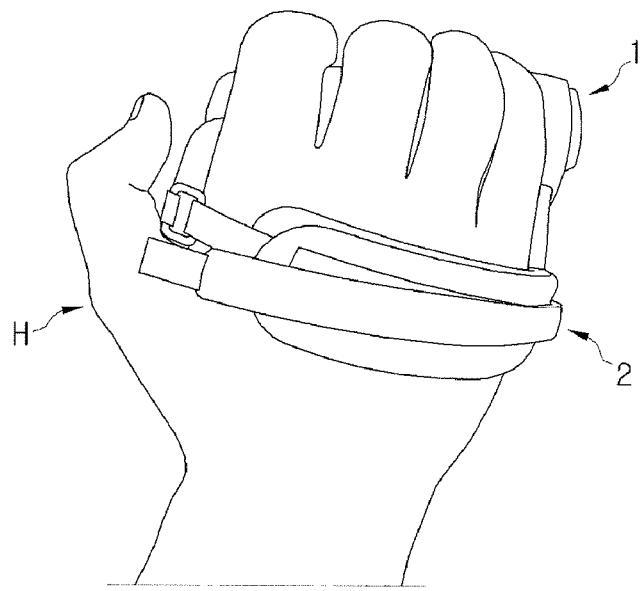
FIGS. 2A and 2B are views illustrating the grip position according to an angle shot of the general image photographing apparatus.
Figure 2B:
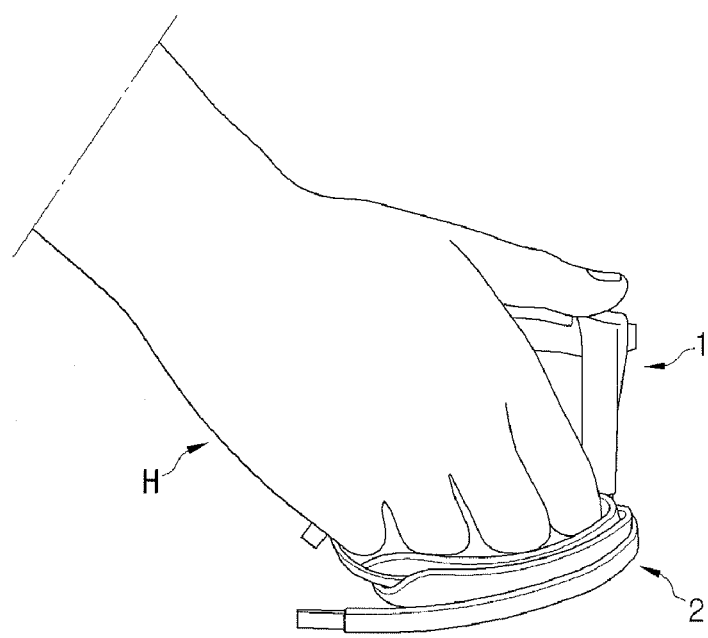

Reference will now be made in detail to embodiments of the present general inventive concept, examples of which are illustrated in the accompanying drawings, wherein like reference numerals refer to the like elements throughout. The embodiments are described below in order to explain the present general inventive concept by referring to the figures.

Figure 3:
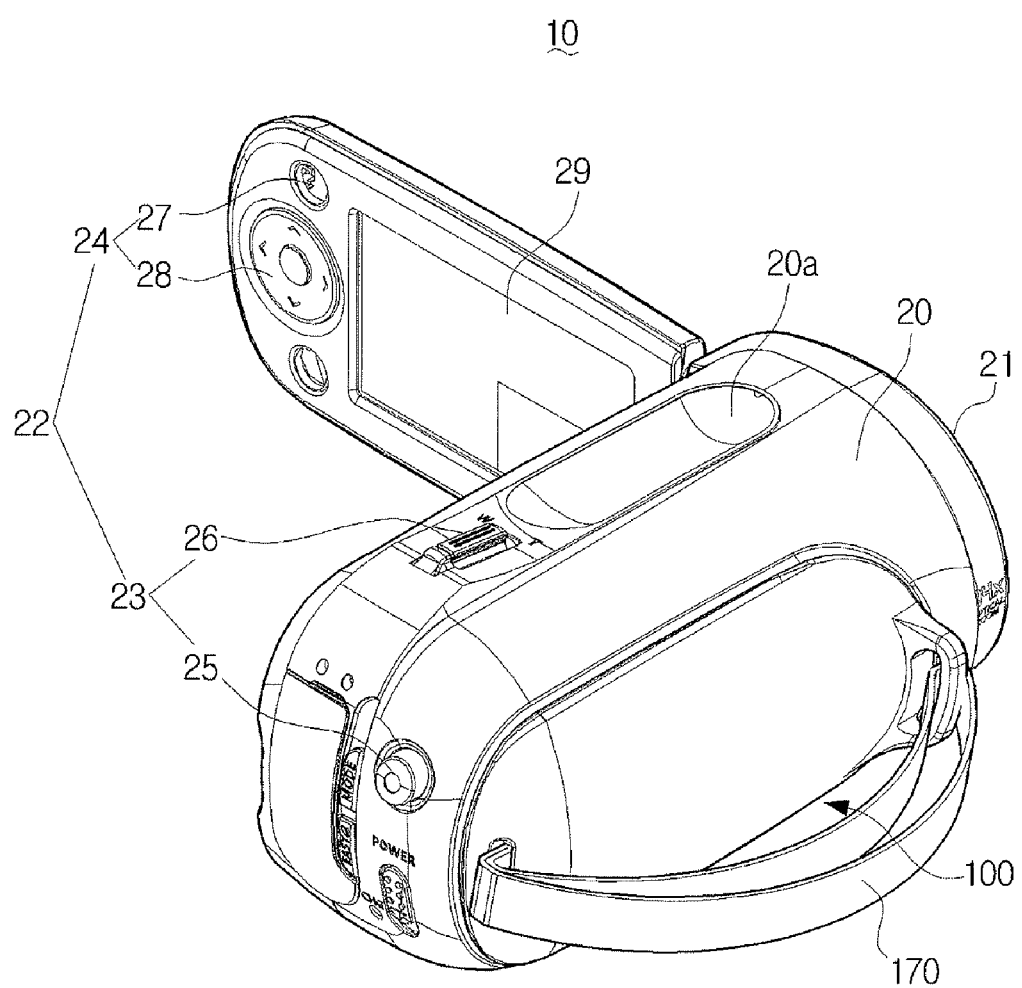
FIG. 3 is a perspective view schematically illustrating an image photographing apparatus according to an exemplary embodiment of the present general inventive concept.

Referring to FIG. 3, an image photographing apparatus 10 according to an exemplary embodiment of the present general inventive concept includes a main body 20 and a grip device 100.

The main body 20 includes a lens unit 21 to photograph an object, and a button unit 22 through which a user can input a plurality of manipulation signals.

The lens unit 21 is disposed in a front side of the main body 20, and may be pointed towards an object to be photographed when a user wishes to operate the image photographing apparatus to photograph the object. Video captured by the lens unit 21 is played back on a display unit 29, which is pivotably mounted on the main body 20 and is capable of being opened and closed about the main body 20.

The button unit 22 includes a plurality of buttons disposed at appropriate positions on the main body 20. For example, the button unit 22 includes a first button unit 23 and a second button unit 24 which are used when the image photographing apparatus is at different photographing positions. The first button unit 23 includes a first photographing button 25 and a first zoom button 26, and the second button unit 24 includes a second photographing button 27 and a second zoom button 28.

The first photographing button 25 and first zoom button 26 are disposed in a rear side and an upper side of the main body 20, respectively, and the second photographing button 27 and second zoom button 28 are disposed in the display unit 29. The first photographing button 25 and first zoom button 26 have the same functions as the second photographing button 27 and second zoom button 28, respectively, though on different positions of the main body 20.

A video capture signal or a still image capture signal may be input according to the time period during which the manipulation signals are input, that is, whether the first and second photographing buttons 25 and 27 are pressed down for a short or a long period of time.

The first and second zoom buttons 26 and 28 are used to input zoom-in or zoom-out signals according to a direction in which a user pushes the first and second zoom buttons 26 and 28. For example, a user may input a zoom-out signal by pushing the first and second zoom buttons 26 and 28 to the right, and a user may input a zoom-in signal by pushing the first and second zoom buttons 26 and 28 to the left.

The main body 20 further includes a power supply (not illustrated) therein to receive power from outside to recharge and provide driving power to the main body 20.

The main body 20 according to the present embodiment may record captured video in a built-in semiconductor memory (not illustrated), which is mounted in the main body and is capable of reading and writing data, and may play back the recorded video, without employing a separate external recording medium, but the present general inventive concept is not limited thereto. Accordingly, the present general inventive concept is applicable to an image photographing apparatus in which a detachable semiconductor memory detachably mounted in a portable external recording medium or in the main body 20 is selectively adopted.

A configuration of the main body 20 will be described in detail with reference to FIG. 8, which is an internal block diagram illustrating the image photographing apparatus 10.

The grip device 100 is rotatably mounted on one side of the main body 20.

The grip device 100 forms a cylindrical shape with the main body 20. Accordingly, the grip device 100 has a shape created by vertically cutting one side of the main body 20. However, the present general inventive concept is not limited to the cylindrical shape, and accordingly the grip device 100 and the main body 20 may have a polygonal shape.

Figure 6A:
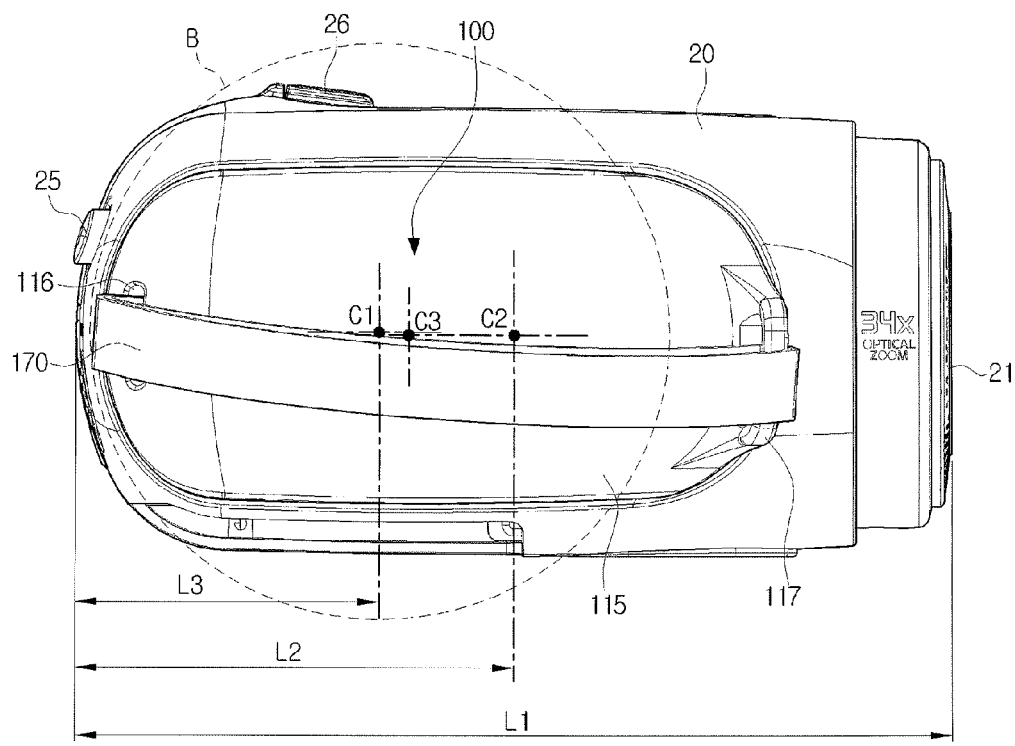
FIGS. 6A to 6D are side views schematically illustrating a rotation status of the grip device with respect to the main body of the image photographing apparatus.
Figure 6B:
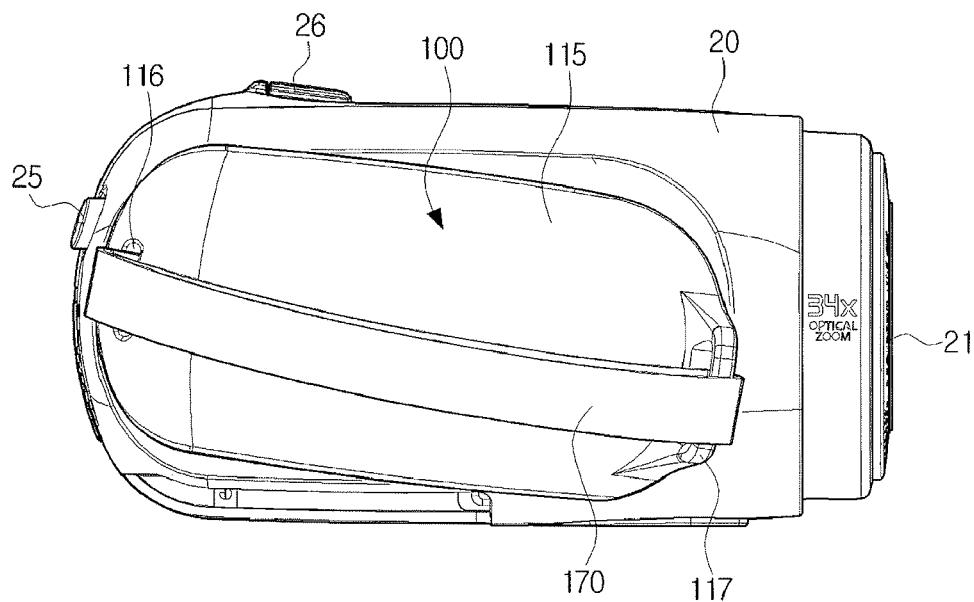

The grip device 100 is rotatable between a first position in which the user may photograph a high-angle object and a second position in which a low-angle object may be photographed. The first position of the grip device 100 is illustrated in FIG. 6A and the grip device 100 rotated to the second position is illustrated in FIG. 6D, but the first and second positions are not limited to the high-angle and low-angle shots. Note that it is possible to photograph objects at any positions from a variety of angles according to user convenience.

Figure 6C:
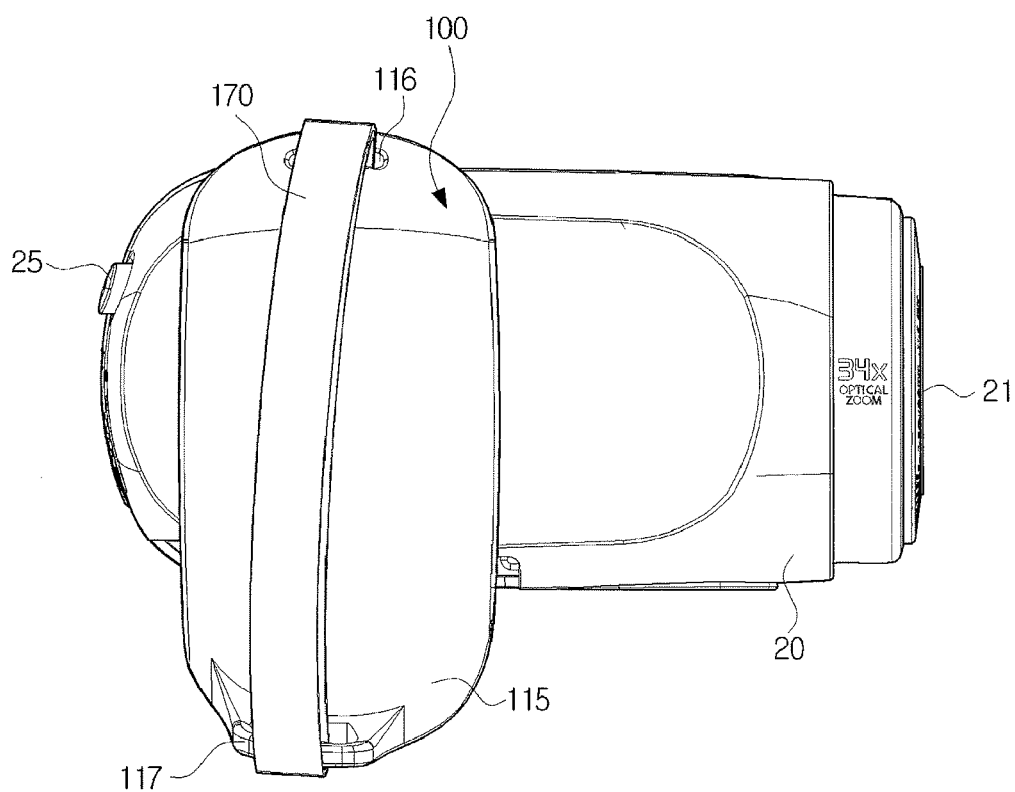
Figure 6D:
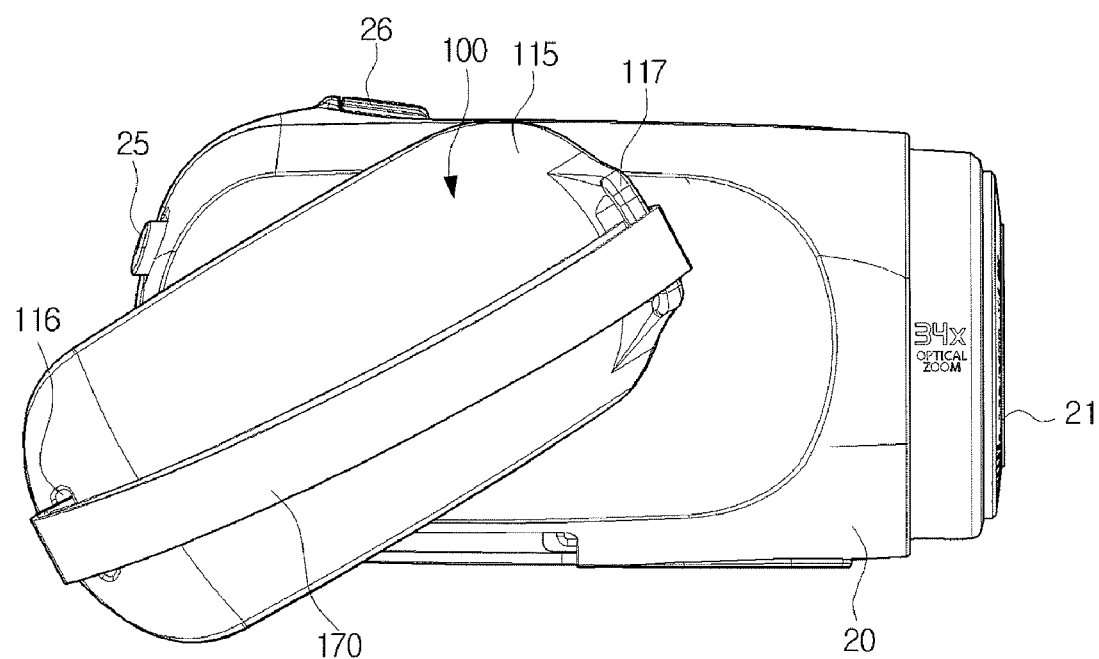

Referring to FIGS. 6A and 6C, a rotational center C1 of the grip device 100 does not coincide with a geometrical center C2 of the main body 20. Additionally, the rotational center C1 of the grip device 100 does not coincide with a geometrical center C3 of the grip device 100. The geometrical center C2 of the main body 20 also does not coincide with the geometrical center C3 of the grip device 100. Accordingly, as illustrated in FIG. 6A, the geometrical center C2 of the main body 20, the geometrical center C3 of the grip device 100 and the actual rotational center C1 of the grip device 100 are arranged sequentially from the front side of the main body 20 in which the lens unit 21 is disposed.

Specifically, the rotational center C1 of the grip device 100 is in the center of a button operating range B in which the user can manipulate the first button unit 23 of the button unit 22. The button operating range B of the first button unit 23 is based on a typical length of a user's forefinger, which may generally be used to manipulate the buttons. Accordingly, the rotational center C1 of the grip device 100 is in a direction of a user who grips the main body 20 and uses the image photographing apparatus, that is, on a rear side of the main body 20.

The rotational center C1 of the grip device 100 takes into account a rotation range to enable the user to comfortably hold the main body 20 by rotating the grip device 100 while gripping the grip device 100.

In this embodiment, a total length L1 of the main body 20 is approximately 120 mm, and a radius L2 from the geometrical center C2 of the main body 20 to each end is approximately 60 mm. A radius L3 of the button operating range B is approximately 40 mm, in order that the button unit 22 disposed on the rear and upper sides of the main body 20 can be manipulated using the user's forefinger. Accordingly, the rotational center C1 of the grip device 100 is spaced apart from the rear side at a distance of 40±5 mm towards the front side of the main body 20. That is, the rotational center C1 of the grip device 100 is in the direction of the user, that is, from the geometrical center C2 of the main body 20 towards the rear side of the main body 20 at a distance of approximately 20 mm.

A rotation angle between the first and second positions in which the grip device 100 rotates is in a range of approximately 0° to 170°. Specifically, the first position of the grip device 100 has a rotation range within 0° to 20°, and the second position of the grip device 100 has a rotation range within 130° to 170°. In this embodiment, the rotation ranges of the first and second positions are 0° to 10° and 130° to 140°, respectively.

The rotation angle between the first and second positions takes into account convenience of a user in gripping and manipulating the image photographing apparatus when the user is holding the grip device 100, and the size of the main body 20.

While the position of the rotational center C1 and the rotation angle of the grip device 100 take into account a typical hand size of an adult and the length L1 of the main body 20 in this embodiment, the position of the rotational center C1 and the rotation angle may vary according to the hand size of a user and the length L1 of the main body 20.

Figure 4A:
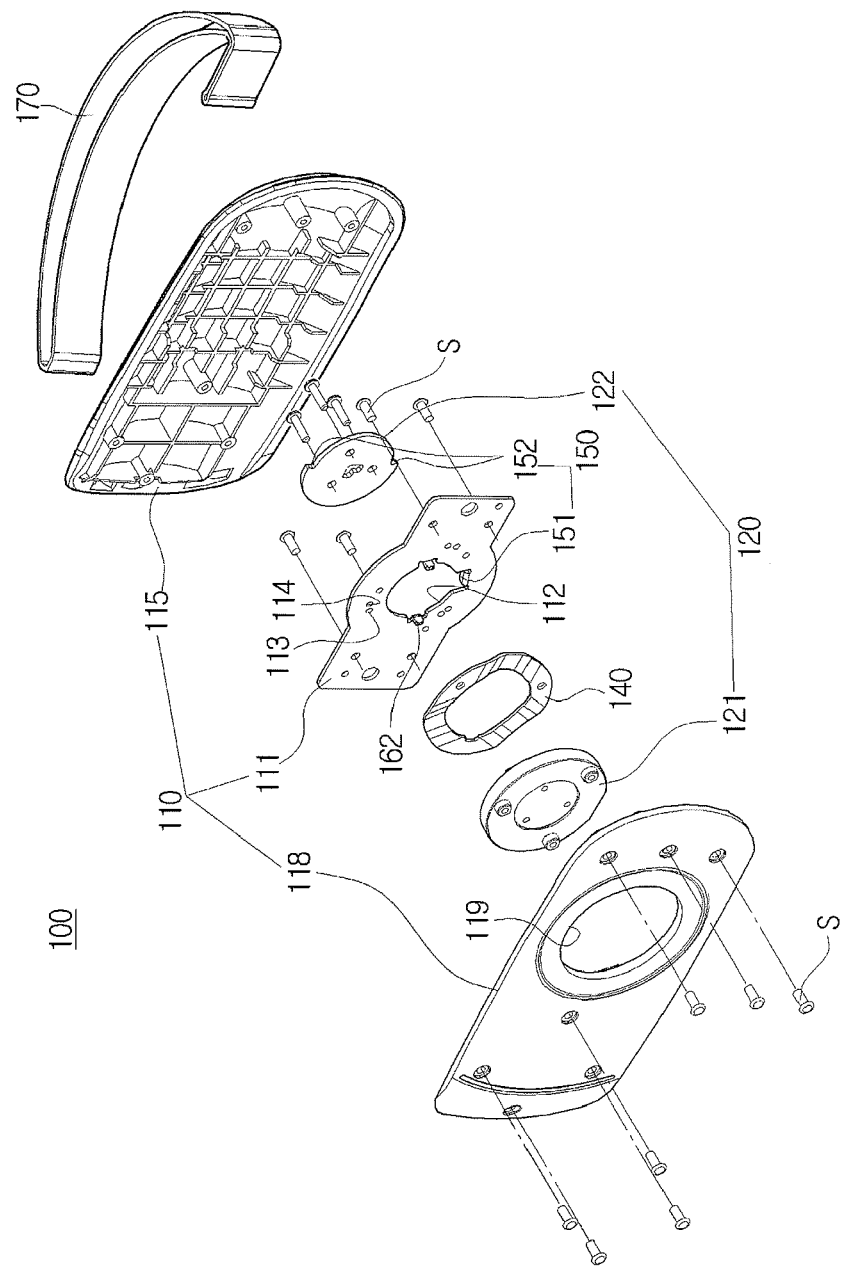
FIGS. 4A and 4B are exploded perspective views schematically illustrating a grip device illustrated in FIG. 3.
Figure 4B:
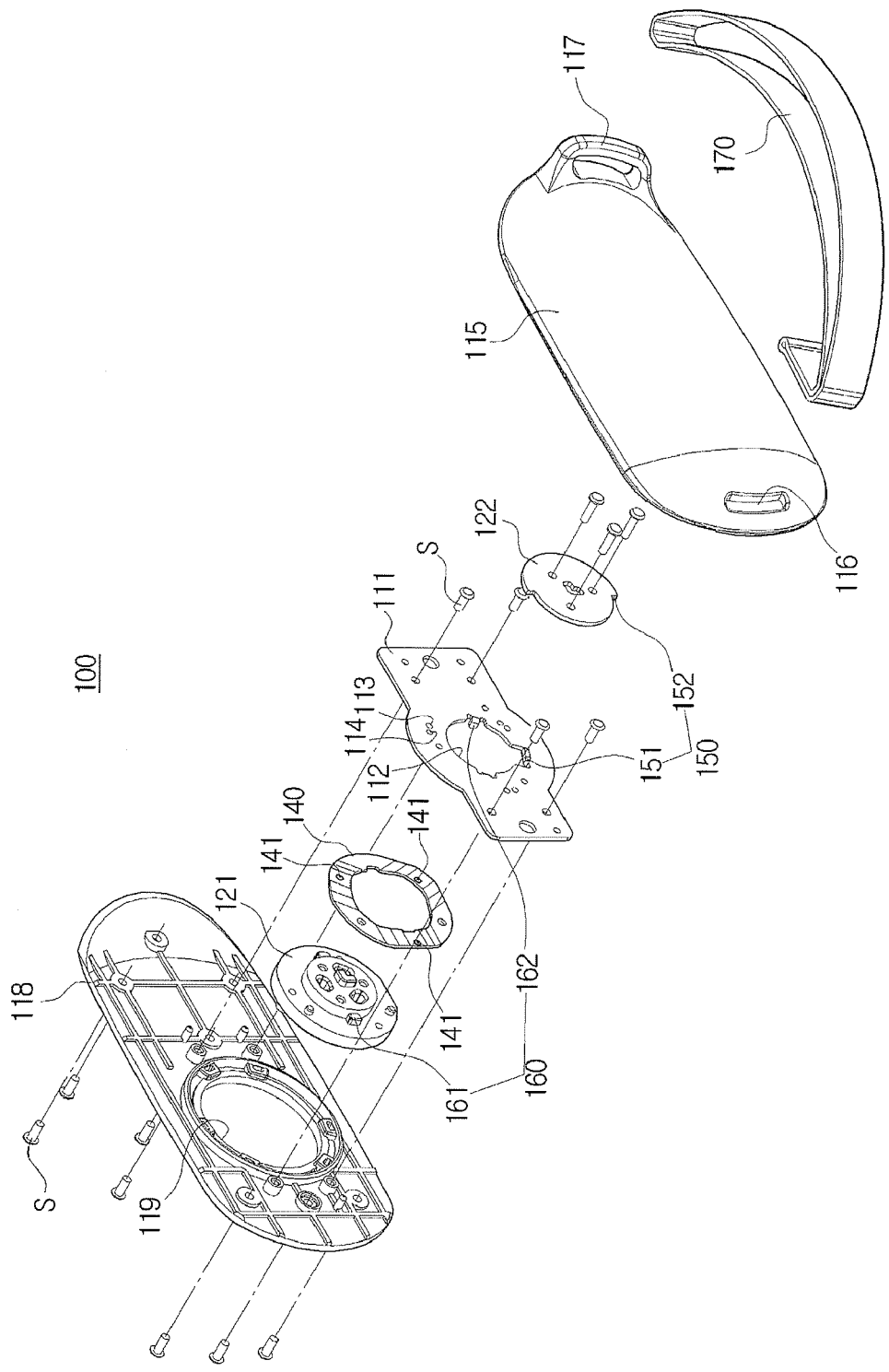
Figure 4C:
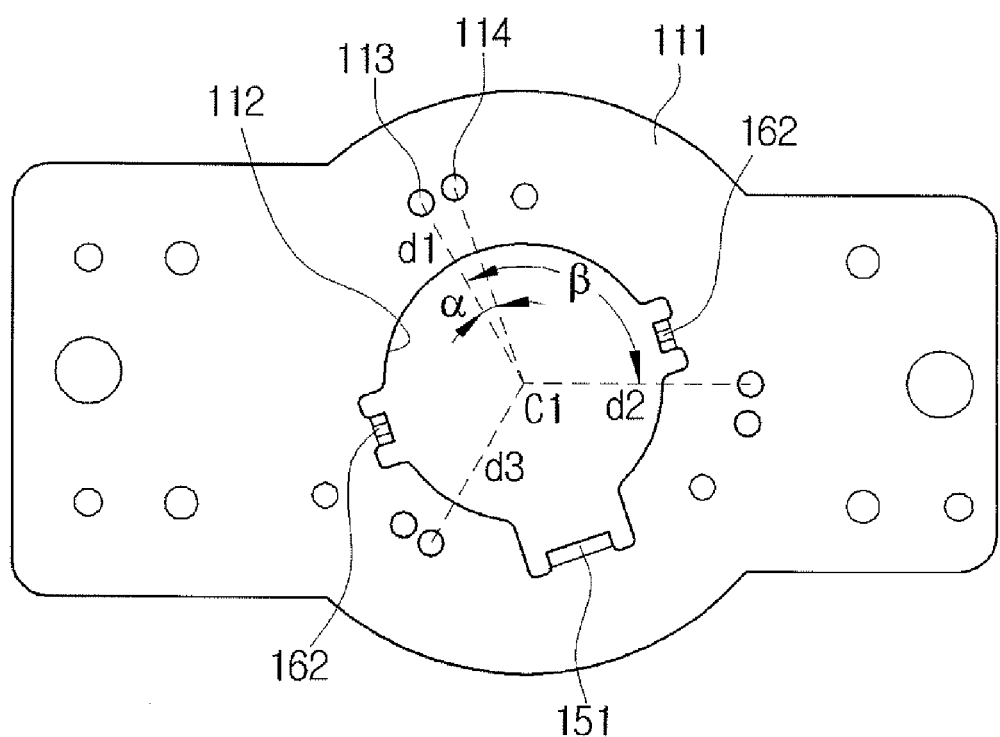
FIG. 4C is a view schematically illustrating a rotation member of FIGS. 4A and 4B.
Figure 5:
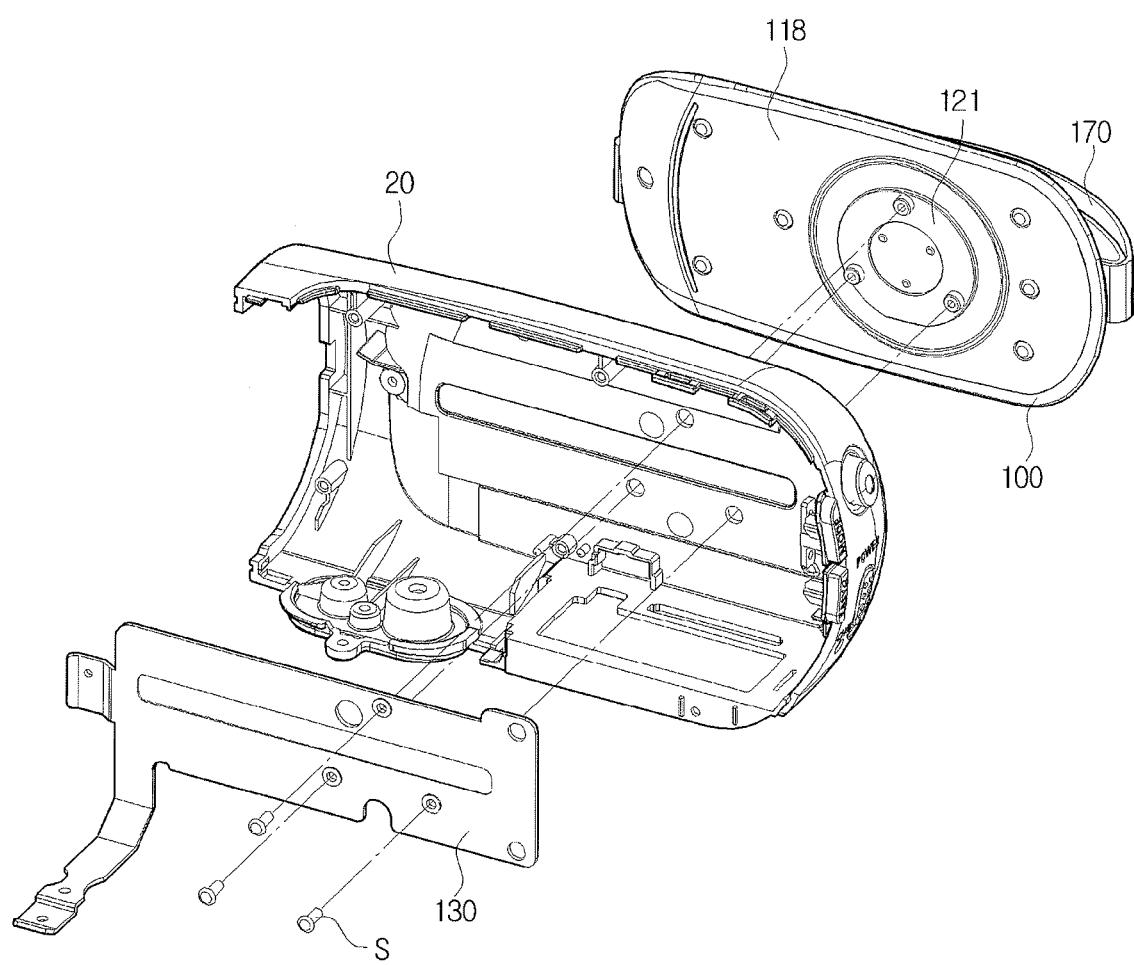
FIG. 5 is an exploded perspective view schematically illustrating how the grip device is attached to the main body of the image photographing apparatus.

As illustrated in FIGS. 4A to 5, the grip device 100 includes a rotation unit 110, a connection unit 120, a reinforcing bracket 130, an elastic member 140 and a stopper unit 150.

The rotation unit 110 rotates about the main body 20. The rotation unit 110 forms a cylindrical shape with the main body 20. A rotational center of the rotation unit 110 coincides with the rotational center C1 of the grip device 100, as illustrated in FIG. 6A.

Referring to FIGS. 4A-5, the rotation unit 110 includes a rotation member 111, a first rotation casing 115 and a second rotation casing 118.

The rotation member 111 rotates based on the rotational center C1 of the rotation unit 110. A first mounting hole 112 is formed in the rotational center C1 to connect to the connection unit 120.

The first rotation casing 115 is disposed facing the second rotation casing 118 with the rotation member 111 disposed therebetween to form the exterior of the grip device 100. The first rotation casing 115 forms an outer surface of the grip device 100, and the second rotation casing 118 faces an outer surface of one side of the main body 20.

A grip band 170 is mounted on the first rotation casing 115 in order that the user can easily grip the grip device 100. To achieve this, a band insertion groove 116, into which one end of the grip band 170 is inserted, and a band support member 117 to support an opposite end of the grip band 170 are disposed in the first rotation casing 115.

In the configuration described above, in order to grip the grip device 100, the user puts his or her hand H into a space between the first rotation casing 115 and the grip band 170, and wraps his or her palm around the outer surface of the first rotation casing 115, so that the back of the hand H is supported by the grip band 170, as illustrated in FIGS. 7A to 7E.

Referring to FIGS. 4A-5, the second rotation casing 118 includes a second mounting hole 119 through which the connection unit 120 is connected to the main body 20.

The rotation force of the rotation unit 110 as configured above is exerted by rotating either the first rotation casing 115 or the main body 20 when the user's palm is wrapped around the first rotation casing 115 and the user's other hand grips the main body 20.

In more detail, when the user rotates the grip device 100 while holding the first rotation casing 115 using his or her hand or rotates the main body 20 while holding the main body 20 using his or her other hand, the rotation unit 110 rotates about the main body 20. Alternatively, the user also can use both hands to rotate both the grip device 110 and the main body 20.

The connection unit 120 may connect the rotation unit 110 to the main body 20 so that the rotation unit 110 can rotate between the first position and the second position. The connection unit 120 includes a first connecting member 121 and a second connecting member 122.

The first and second connecting members 121 and 122 connect the rotation unit 110 to the main body 20 so that the rotation unit 110 rotates with respect to the main body 20. Specifically, the first and second connecting members 121 and 122 are coupled through the first mounting hole 112 of the rotation member 111 and then coupled to the main body 20 through the second mounting hole 119 of the second rotation casing 118 as illustrated in FIGS. 4A to 5.

To achieve this, the first connecting member 121 may be a circular plate having an external diameter greater than that of the first mounting hole 112 and equal to that of the second mounting hole 119. Additionally, the second connecting member 122 may be a plate having a semicircular shape with an external diameter equal to the diameter of the first mounting hole 112 and a semicircular shape with an external diameter greater than that of the first mounting hole 112.

The reinforcing bracket 130 is coupled with the connection unit 120 with the main body 20 disposed therebetween as illustrated in FIG. 5. The reinforcing bracket 130 is mounted inside the main body 20 to reinforce the strength of the main body 20 when the connection unit 120 is mounted to the main body 20 made of a mold material. Accordingly, the reinforcing bracket 130 may be formed of a material having a high strength, for example, a metal material.

The elastic member 140 is interposed between the first connecting member 121 and the rotation member 111 to generate a friction torque when the rotation unit 110 rotates. Referring to FIG. 4B, a plurality of positioning projections 141 project from the elastic member 140, so the click touch may be provided to the user.

The positioning projections 141 may be inserted into first positioning recesses 113 and second positioning recesses 114 which are disposed in the rotation member 111. In this exemplary embodiment of the present general inventive concept, three positioning projections 141 project from the elastic member 140, and the first and second positioning recesses 113. The three positioning projections 141 can also 114 penetrate three areas of the rotation member 111. However, it should be understood that the numbers of the first and second positioning recesses 113 and 114 and the positioning projections 141 are not limited thereto. Accordingly, two or more first and second positioning recesses 113 and 114 and two or more positioning projections 141 can be formed corresponding to the first and second positions.

The plurality of positioning projections 141 are spaced apart at an interval of 150° which is the rotation angle between the first position and the second position. Accordingly, the first positioning recesses 113 and the second positioning recesses 114 are also spaced apart at an interval of 150°.

In more detail, as illustrated in FIG. 4C, the first positioning recesses 113 are spaced apart from the second positioning recesses 114 at interval a of 10°, and the first positioning recesses 113 are spaced apart at interval β of 150°. The second positioning recesses 114 are also spaced apart at the interval of 150°.

The interval α of 10° between the first and second positioning recesses 113 and 114 enables the user to grip the main body 20 in a more comfortable position when he or she photographs an object at the high angle at the first position. FIG. 6B illustrates a situation in which the positioning projection 141 is released from the first positioning recess 113 and is then inserted into the second positioning recess 114 by rotating the rotation member 111.

In FIG. 4C, the positioning recesses 113 and 114 have different radiuses d1, d2 and d3 from the rotational center C1 of the rotation member 111. Accordingly, the positioning recesses 113 and 114 disposed in the three areas can be spaced apart by 150°, rather than by 120°, along the rotation radiuses d1, d2 and d3 based on the rotational center C1 of the rotation member 111.

The positioning projections 141 protruding from the elastic member 140 also have different radiuses corresponding to the rotation radiuses d1, d2 and d3 of the positioning recesses 113 and 114.

Accordingly, the positioning projections 141 are selectively inserted into the positioning recesses 113 and 114 by rotating the rotation member 111, so the click touch may be provided to the user when the rotation member 111 rotates.

The stopper unit 150 restricts the rotation range between the first position and second position of the rotation unit 110 with respect to the main body 20. The stopper unit 150 includes a first locking projection 151 and a pair of first locking jaws 152 as illustrated in FIGS. 4A and 4B.

The first locking projection 151 protrudes from the rotation member 111, and the first locking jaws 152 are disposed on an outer circumference of the second connecting member 122 to correspond to the first locking projection 151.

Specifically, the first locking projection 151 extends from the outer circumference of the first mounting hole 112 to the second connecting member 122. The first locking jaws 152 are disposed at two areas where different external diameters of the second connecting member 122 are connected. An interval of the first locking jaws 152 is 150° corresponding to the rotation range of the rotation member 111.

Accordingly, when the rotation member 111 rotates, the first locking projection 151 rotates between the first locking jaws 152 along the outer circumference of the second connecting member 122, so that the rotation range of the rotation member 111 can be restricted.

Referring to FIGS. 4A and 4B, the grip device 100 further includes a substopper unit 160 including a second locking projection 161 protruding from the first connecting member 121 and a third locking projection 162 protruding from the rotation member 111 to correspond to the second locking projection 161.

Specifically, the third locking projection 162 protrudes from the outer circumference of the first mounting hole 112 to the first connecting member 121. The second locking projection 161 protrudes from the first connecting member 121 toward the rotation member 111 so that the second locking projection 161 comes into contact with the third locking projection 162.

Here, a single second locking projection 161 and a pair of the third locking projections 162 are formed. Therefore, if one pair of third locking projections 162 is hooked in the second locking projection 161 when the rotation member 111 rotates, the rotation of the rotation member 111 may be restricted. An interval of the pair of third locking projections 162 is also 150°, corresponding to the rotation range between the first position and the second position.

Referring to FIG. 3, a guide curved surface 20a is formed in the upper side of the main body 20 in order to receive the user's hand gripping the grip device 100 and holding the main body 20.

Figure 7A:
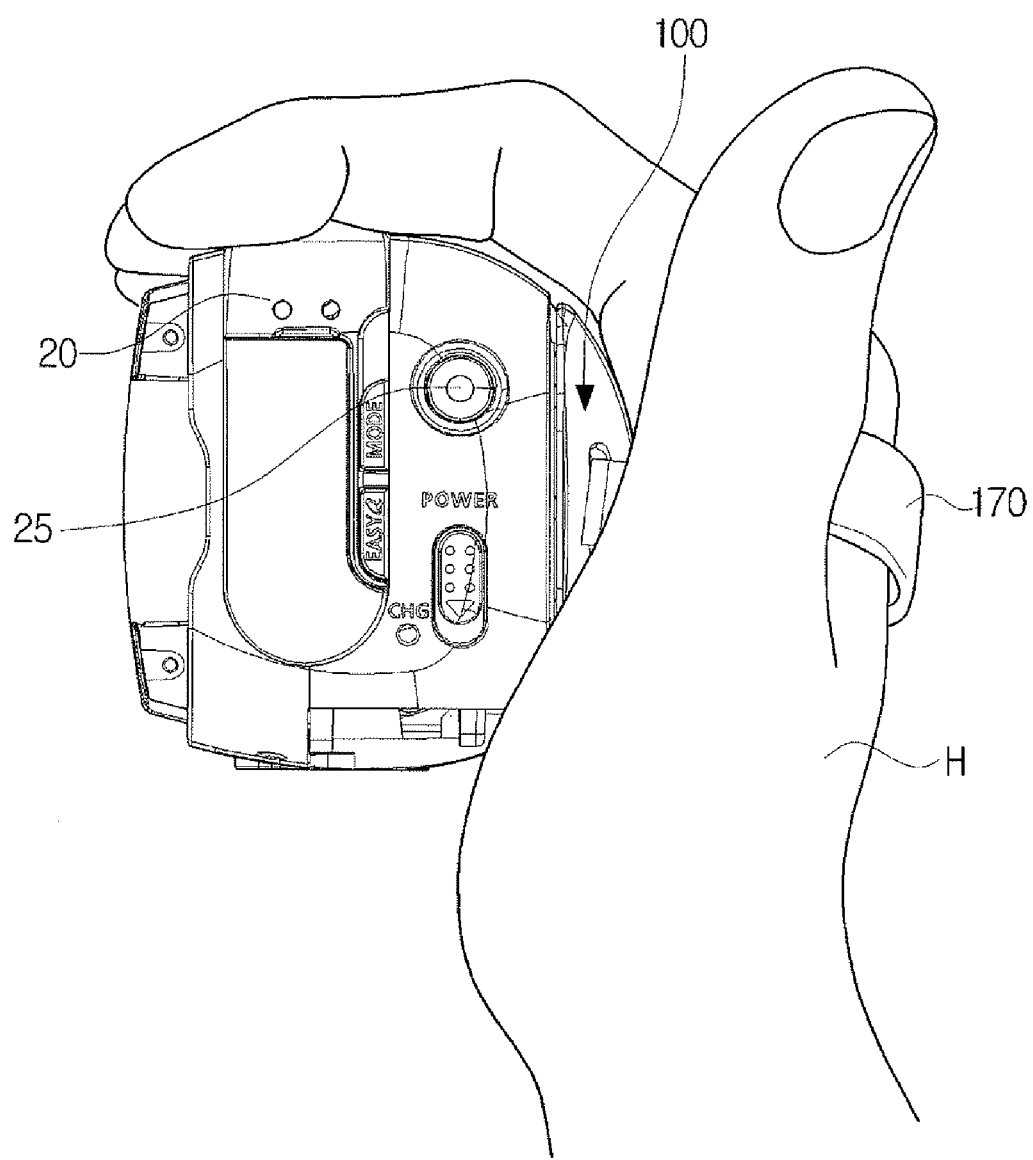
FIGS. 7A to 7E are views schematically illustrating the grip position of the grip device according to an angle shot of the image photographing apparatus.
Figure 7B:
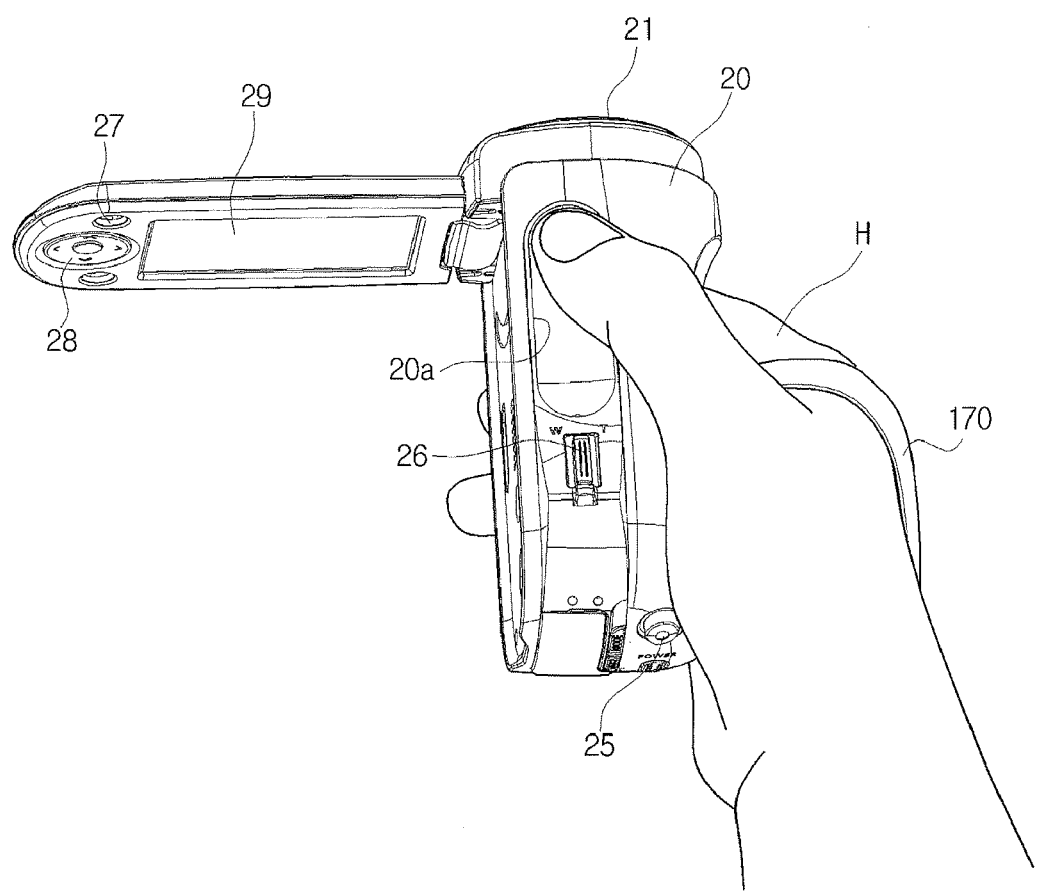

As illustrated in FIG. 7A, when the grip device 100 is positioned at the first position, the guide curved surface 20a receives the middle finger, the ring finger, and the little finger of the hand of the user. When the grip device 100 is rotated to the second position, the guide curved surface 20a receives the thumb of the hand of the user as illustrated in FIG. 7B.

The guide curved surface 20a enables the user to hold the main body 20 more comfortably by gripping the grip device 100 and prevents the user's hand from slipping from the main body 20.

Hereinafter, a gripping operation of the grip device and the image photographing apparatus having the grip device as configured above will be described with reference to FIGS. 3 to 7D.

Figure 7C:
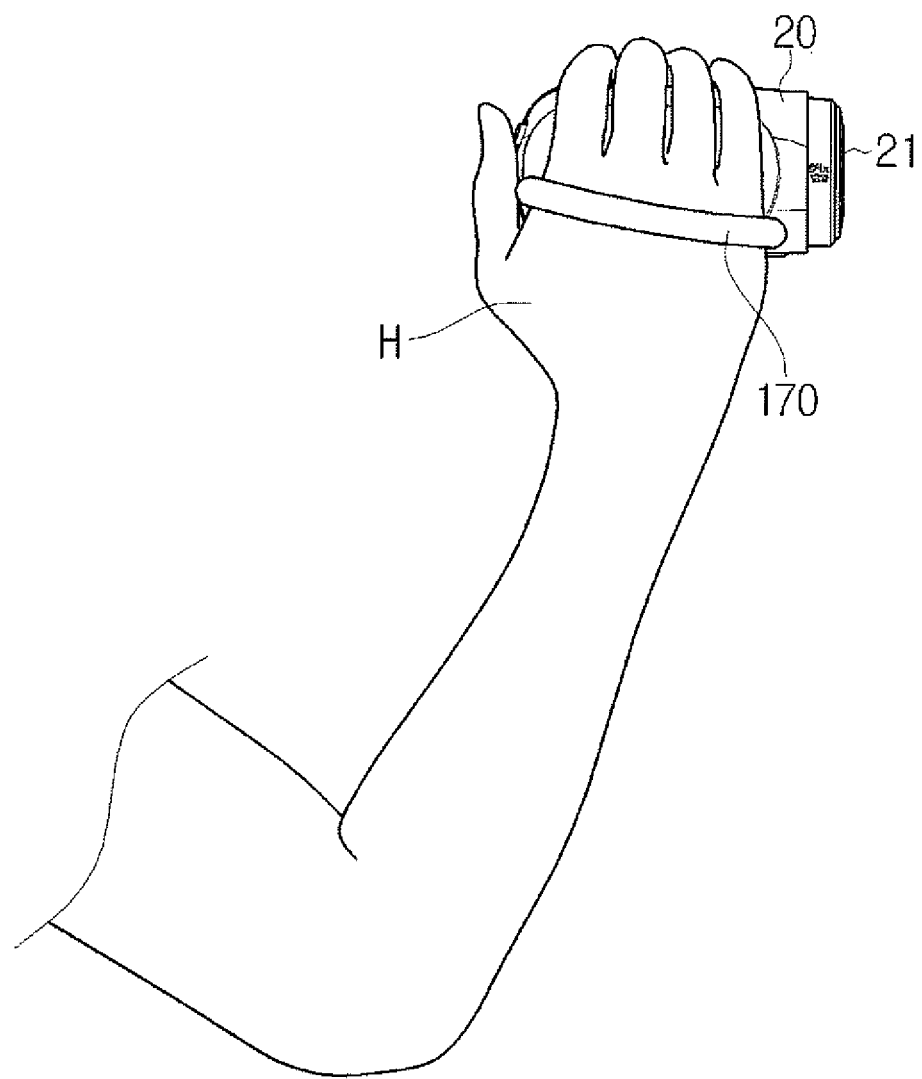

To photograph an object at a high angle, the user holds the main body 20 by gripping the grip device 100 positioned at the first position with respect to the main body 20 as illustrated in FIGS. 6A, 7A and 7C. In this situation, as illustrated in FIG. 7C, a user's wrist forms a straight line with his or her forearm without bending the wrist, so the user can comfortably hold the main body 20.

Even when the user rotates the grip device 100 at the first position by approximately 10°, as illustrated in FIG. 6B, for the sake of user convenience, the user can still photograph the object at a high angle at the first position. In this situation, if the user rotates the grip device 100 with respect to the main body 20 by approximately 10° while gripping the grip device 100, the rotation member 111 may be rotated approximately 10° in a direction of the arrows illustrated in FIG. 4C.

According to the rotation of the rotation member 111, the positioning projection 141 that had been inserted into the first positioning recess 113 may be released from the first positioning recess 113 and then be inserted into the second positioning recess 114.

When the user holds the main body 20 using the grip device 100 at the first position, the user inputs a manipulation signal to the first button unit 23 using the thumb of the user's hand holding the main body 20. Accordingly, the user can operate the button unit 22 while holding the main body 20 using only one hand.

Alternatively, to photograph the object at a low angle, the user rotates the grip device 100 from the first position to the second position while gripping the grip device 100. In this situation, the rotational center C1 of the grip device 100 does not coincide with the geometrical center C2 of the main body 20 or with the geometrical center C3 of the grip device 100 as illustrated in FIG. 6A. In this embodiment, the grip device 100 is eccentric from the geometrical center C2 of the main body 20 toward the rear side of the main body 20, that is, toward the user. Accordingly, the grip device 100 is rotated eccentrically about the main body 20 as illustrated in FIGS. 6C and 6D.

The grip device 100 disposed at the first position as illustrated in FIG. 6A to FIG. 6B may be rotated to the second position by approximately 150°. Accordingly, the rotation of the grip device 100 may be restricted by the stopper unit 150 and the click touch may be provided by the positioning projections 141 and positioning recesses 113 and 114.

Specifically, as illustrated in FIGS. 4A to 4C, if the second locking projection 161 protruding from the first connecting member 121 is hooked between the pair of third locking projections 162 spaced apart at an interval of 150°, the rotation range in which the rotation member 111 rotates about the first connecting member 121 may be restricted.

Additionally, the pair of locking jaws 152 spaced at an interval of 150° may interfere with the rotation of the first locking projection 151 protruding from the rotation member 111. Accordingly, the rotation range in which the rotation member 111 rotates about the second connecting member 122 may be limited.

As the positioning projection 141 projecting from the elastic member 140 is released from the first positioning recess 113 at the first position and gets into the first positioning recess 113 of a different position spaced apart by 150°, the click touch is provided to the user. In this situation, when the rotation member 111 rotates, the elastic member 140 interposed between the first connecting member 121 and the rotation member 111 produces the friction torque.

As such, when the grip device 100 is turned to the second position, the user grips and holds the main body 20 so that the user's remaining fingers, excluding the thumb put on the guide curved surface 20a, support the bottom of the main body 20, as illustrated in FIG. 7B. In this situation, the user manipulates the second button unit 24 disposed on the display unit 29, rather than the first button unit 23 of the main body 20, using his or her other hand which is not gripping the main body 20.

Figure 7D:
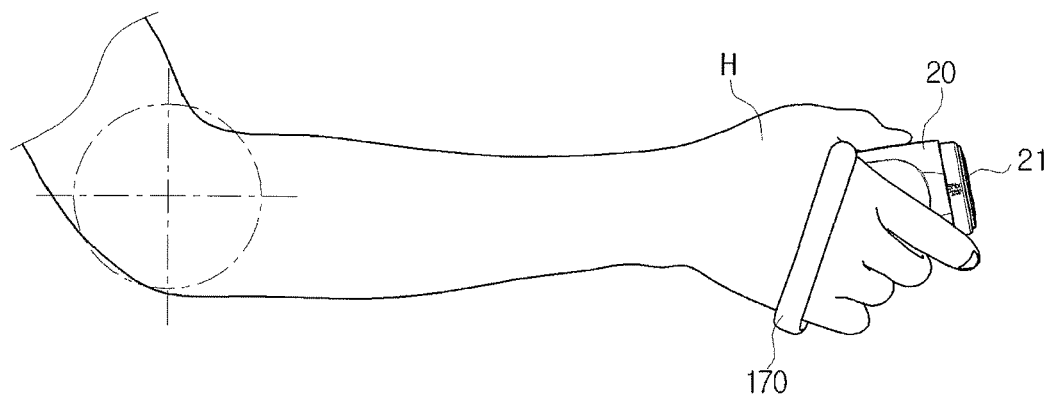

If the grip device 100 is disposed at the second position with respect to the main body 20, the user can comfortably photograph the object at a low angle without bending his or her wrist, which may form a straight line with his or her forearm, as illustrated in FIG. 7D.

Figure 7E:
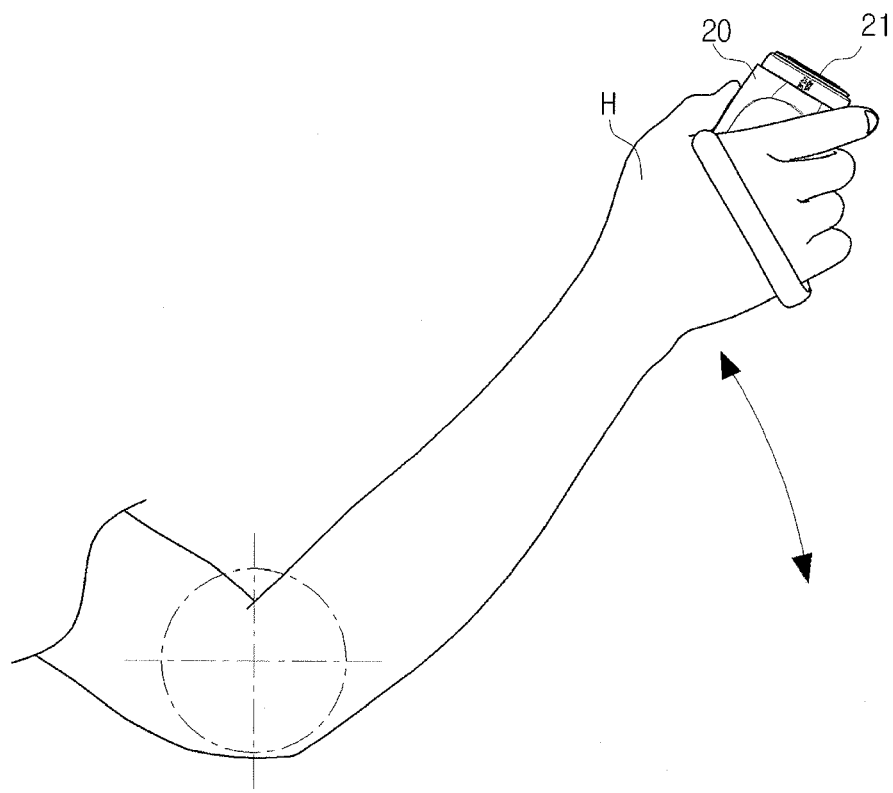

In addition, even when the user desires to lift his or her hand in order to photograph an object at a high angle while gripping the grip device 100 at the second position, he or she can move his or her hand without bending his or her wrist by swiveling his or her forearm, as illustrated in FIG. 7E. That is, the user grips the main body 20 only using power of the forearm without applying power to the wrist, so the user can photograph an object at any position. Therefore, the user can photograph objects placed at various positions without straining his or her wrist.

Figure 8:
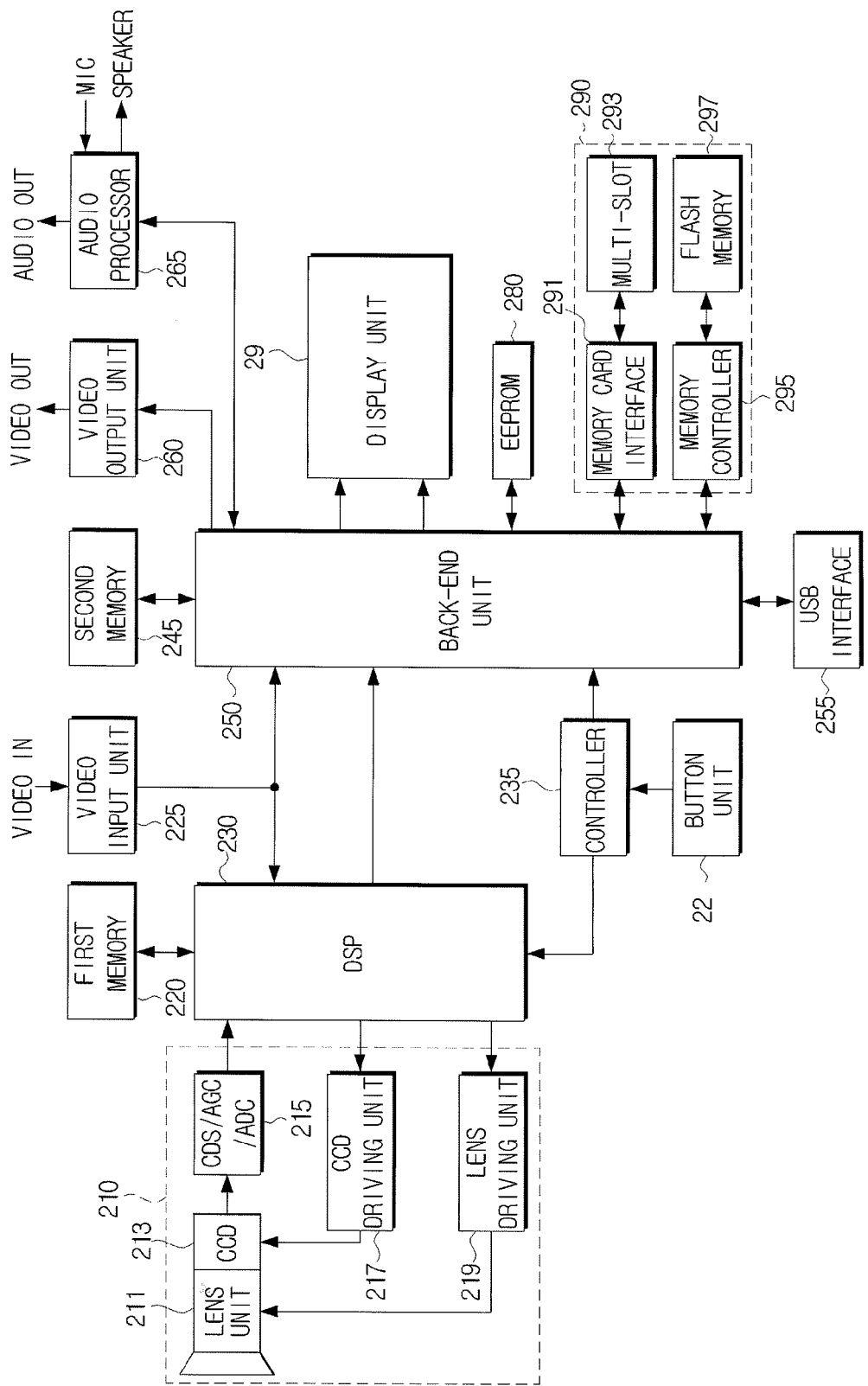
FIG. 8 is an internal block diagram illustrating the image photographing apparatus according to an exemplary embodiment of the present general inventive concept.

FIG. 8 is an internal block diagram illustrating the image photographing apparatus according to an exemplary embodiment of the present general inventive concept.

The image photographing apparatus according to the exemplary embodiment of the present general inventive concept includes a capturing unit 210, a first memory 220, a video input unit 225, a digital signal processor (DSP) 230, a controller 235, a button unit 22, a second memory 245, a back-end unit 250, a universal serial bus (USB) interface 255, a video output unit 260, an audio processor 265, a display unit 29, an electrically erasable and programmable read only memory (EEPROM) 280, and a recording unit 290.

The capturing unit 210 photo-electrically converts an optical signal input through a lens to an electrical signal, and performs predetermined signal processing of the electrical signal. The capturing unit 210 includes a lens unit 211, a charge coupled device (CCD) 213, a correlated double sampler (CDS)/automatic gain controller (AGC)/analog-to-digital converter (ADC) 215, a CCD driving unit 217 and a lens driving unit 219.

The lens unit 211 forms an optical image of the photographed object on an optical surface of the CCD 213. The lens unit 211 corresponds to the lens unit 102 of FIG. 3.

The lens driving unit 219 drives the lens unit 211. In more detail, the lens driving unit 219 makes the lens unit 211 zoom in and out by driving the lens unit 211 with a zoom-motor (not illustrated), adjusts the focus by driving the lens unit 211 with a focus-motor, and controls the opening degree of iris diaphragm (not illustrated) of the lens unit 211 by driving the lens unit 211 with an iris-motor.

The CCD 213 is driven by the CCD driving unit 217 to generate and output an electrical signal corresponding to the optical image formed in the optical surface by the lens unit 211.

The CDS/AGC/ADC 215 performs signal processing such as correlated double sampling, automatic gain controlling, and A/D conversion with respect to the electrical signal output from the CCD 213.

When the DSP 230 performs signal processing with respect to the video, the first memory 220 is a buffer providing a necessary recording area. The first memory 220 can be implemented using a flash memory and/or synchronous dynamic random access memory (SDRAM).

The video input unit 225 receives video from an external device and provides the input video to the DSP 230 and/or the back-end unit 250.

The DSP 230 is an element to perform signal processing with respect to the video fed from the capturing unit 210 or the video input unit 225 and outputs the processed video to the back-end unit 250. When processing the signal, the DSP 230 uses the first memory 220 as the buffer.

In more detail, the DSP 230 converts the format of the video signal fed from the capturing unit 210, controls the digital zoom to adjust the video scale, controls automatic white balancing (AWB), and then outputs the processed video to the back-end unit 250. The DSP 230 controls the lens driving unit 217 to perform automatic focus (AF) and automatic exposure (AE) functions.

Also, the DSP 230 compresses the video signal output from the capturing unit 210 to a file of a Joint Photographic Experts Group (JPEG) format, which is the compression format suitable for the still image, and outputs the compression file to the back-end unit 250. The DSP 230 outputs a video signal generated by uncompressing the JPEG file input from the back-end unit 250, to the back-end unit 250.

The controller 235 controls the signal processing/signal transfer operation of the DSP 230 and the signal processing/signal transfer operation of the back-end unit 250 according to a user's manipulation command input through the button unit 22.

The button unit 22 includes the first and second photographing buttons 25 and 27 and the first and second zoom buttons 26 and 28 of the first and second button units 23 and 24 as illustrated in FIG. 3, and buttons to input a plurality of manipulation signals.

The second memory 245 is a buffer which provides a necessary recording area when the back-end unit 250 performs signal processing. Also, the second memory 245 contains graphics, menus, and text required for the back-end unit 250 to process on-screen display (OSD). The second memory 245 can be implemented by a flash memory and/or SDRAM.

The back-end unit 250 is an element responsible to provide signal processing such as compressing, expanding, and playing back with respect to the video and/or audio.

Specifically, the back-end unit 250 encodes the video signal input from the DSP 230 to fit for the display and outputs the encoded video signal to the display unit 29 or the video output unit 260.

The back-end unit 250 can perform the OSD processing and output graphics, menus, and text with the video input from the DSP 230. In doing so, the back-end unit 250 reads the graphics, the menus, and the text recorded to the second memory 245 as OSD information and utilizes them for the OSD processing.

The back-end unit 250 compresses the video signal fed from the DSP 230 and the audio signal fed from the audio processor 265 and provides the generated compression file to the recording unit 290.

The back-end unit 250 restores the video signal and the audio signal by uncompressing the compression file input from the recording unit 290, outputs the restored video signal to the display unit 29, and outputs the restored audio signal to the audio processor 265.

When outputting the restored video signal to the display unit 29, the back-end unit 250 can perform the OSD processing with respect to the restored video.

Furthermore, the back-end unit 250 provides the JPEG file fed from the DSP 230 to the recording unit 290 and provides the JPEG file fed from the recording unit 290 to the DSP 230.

The USB interface 255 provides a USB communication interface between a USB device such as a PC and a printer, and a digital camcorder. The video output unit 260 outputs the video signal output from the back-end unit 250 to a connected external device such as a television (TV).

The audio processor 265 converts an analog audio signal input through an audio input device such as a microphone, to a digital audio signal, and provides the digital audio signal to the back-end unit 250. The audio processor 265 converts a digital audio signal fed from the back-end unit 250 to an analog audio signal and outputs the analog audio signal to a speaker or the connected external device.

The display unit 29 displays the video output from the back-end unit 250 on a liquid crystal display (LCD) which is a type of display element.

The EEPROM 280 is a memory which contains programs and data required for the back-end unit 250 to process and transfer the signals.

The recording unit 290 records the compression file output from the back-end unit 250 to a recording medium. The recording unit 290 includes a memory card interface 291, a multi-slot 293, a memory controller 295, and a flash memory 297.

The memory card interface 291 records the compression file input from the back-end unit 250 to various types of memory card inserted into the multi-slot 293. The multi-slot 293 is formed in the rear side within the main body 20 of FIG. 3.

The memory card interface 291 reads a compression file recorded to the various types of memory card and outputs the read compression file to the back-end unit 250. The memory card can employ a multimedia card (MMC), a secure digital (SD) card, and the like.

The memory controller 295 records the compression file input from the back-end unit 250 to the built-in flash memory 297. The memory controller 295 reads the compression file recorded to the flash memory 297 and outputs the read compression file to the back-end unit 250.

The controller 235 controls the back-end unit 250 and the recording unit 290 to record the compression file output from the back-end unit 250 to one of the disc, the memory card, and the flash memory 297. The user can select the recording medium using a menu provided by the back-end unit 250 through the OSD processing.

The controller 235 controls the file copy between recording media embedded/mounted to the recording unit 290. Specifically, the controller 235 controls the recording unit 290 to copy the file recorded to the flash memory 297 to the memory card, or to copy the file recorded to the memory card to the flash memory 297. In doing so, the user can select the copy type using the menu provided by the back-end unit 250 through the OSD processing.

As set forth above, a user can photograph an object at any intended angle by freely changing a position of his or her hand by rotating his or her wrist without straining the wrist while gripping an image photographing apparatus. Furthermore, a rotational center of a grip device does not coincide with a geometrical center of the grip device, taking into consideration a use range of the user, which increases manipulation capabilities of the user.

Although various embodiments of the present general inventive concept have been illustrated and described, it will be appreciated by those skilled in the art that changes may be made in these embodiments without departing from the principles and spirit of the general inventive concept, the scope of which is defined in the appended claims and their equivalents.

What is claimed is:

1. An image photographing apparatus, comprising:
   a main body extending along a length axis between a front side and a rear side to define a length thereof including a lens unit to photograph an object, and a button unit to input a plurality of manipulation signals; and
   a grip device rotatably mounted on one side of the main body and is rotatable between a first position and a second position in order to photograph objects at different positions, the grip device comprising:
   a rotation unit including a grip unit having a rotational center of the rotation unit that is in the direction of a user and is aligned with a geometrical center of the rotation unit along a radial axis thereof that is parallel to the length axis of the main body in order not to coincide with the geometrical center of the rotation unit; and
   a connection unit to connect the rotation unit to the main body so that the rotation unit is rotatable about the main body,
   wherein the rotation unit comprises: a rotation member; and a first rotation casing and a second rotation casing to enclose the rotation member.

2. The image photographing apparatus of claim 1, wherein the main body forms a cylindrical shape with the grip device.

3. The image photographing apparatus of claim 2, wherein the rotational center of the rotation unit lies at a distance of 40±5 mm from the rear side of the main body to the front side of the main body in which the lens unit is mounted and a rotation angle between the first position and the second position is 0° to 150°.

4. The image photographing apparatus of claim 2, wherein the connection unit comprises: a first connecting member to connect the rotation unit to the main body; and a second connecting member to connect the rotation member to the first connecting member.

5. The image photographing apparatus of claim 4, wherein the grip device further comprises:
   a reinforcing bracket mounted inside the main body, the reinforcing bracket being connected to the first connecting member with the main body disposed therebetween;
   an elastic member mounted between the rotation member and the first connecting member to generate a friction torque;
   a stopper unit to restrict a rotation range of the rotation unit with respect to the main body; the stopper unit including a first locking projection protruding from the rotation member and a locking jaw disposed on an outer circumference of the second connecting member to correspond to the first locking projection; and
   a substopper unit including a second locking projection protruding from the first connecting member and a pair of third locking projections protruding from the rotation member to correspond to the second locking projection.

6. The image photographing apparatus of claim 4, wherein a mounting hole to mount the first connecting member is formed in the second rotation casing.

7. The image photographing apparatus of claim 2, wherein the grip unit comprises: a grip band mounted in the first rotation casing.

8. The image photographing apparatus of claim 1, wherein the button unit comprises:
   a first button unit and a second button unit to input a same manipulation signal at different positions.

9. The image photographing apparatus of claim 8, wherein:
   a display unit is mounted in the main body to display video, and
   the first and second button units are disposed on the main body and the display unit, respectively.

10. An image photographing apparatus, comprising:
    a main body extending along a length axis between a front side and a rear side to define a length thereof including a lens unit to photograph an object, and a button unit to input a plurality of manipulation signals; and
    a grip device rotatably mounted on one side of the main body and is rotatable between a first position and a second position in order to photograph objects at different positions, the grip device comprising:
    a rotation unit comprising:
    a grip unit having a rotational center of the rotation unit that is in the direction of a user and is aligned with a geometrical center of the rotation unit along a radial axis thereof that is parallel to the length axis of the main body in order not to coincide with the geometrical center of the rotation unit;
    a rotation member; and
    a first rotation casing and a second rotation casing to enclose the rotation member; and
    a connection unit including a first connecting member to connect the rotation unit to the main body, and a second connecting member to connect the rotation member to the first connecting member so that the rotation unit is rotatable about the main body;
    a plurality of positioning recesses having different radiuses from the rotational center of the rotation member are provided in the rotation member to correspond to the first and second positions, and
    a positioning projection that protrudes from the elastic member to be inserted into the positioning recesses.

11. A grip device to grip a main body of an image photographing apparatus, the main body extending along a length axis defining a length thereof, the grip device comprising:
    a rotation unit rotatably mounted on one side of the main body, the rotation unit comprises: a rotation member; and a first rotation casing and a second rotation casing to enclose the rotation member; and
    a grip unit having a rotational center of the rotation unit that is in the direction of a user and is aligned with a geometrical center of the rotation unit along a radial axis thereof that is parallel to the length axis of the main body in order not to coincide with the geometrical center of the rotation unit; and
    a connection unit to connect the rotation unit to the main body so that the rotation unit is rotatable about the main body to rotate the grip device between a first and a second position in order to photograph objects at different positions.

12. An image photographing apparatus, comprising:
a main body extending along a length axis between a front side and a rear side to define a length thereof and including a lens unit mounted in the front side thereof to photograph an object, and a button unit to input a plurality of manipulation signals;
a display unit mounted on one side of the main body to display video;
a grip device rotatably mounted in an other side of the main body to rotate between a first position and a second position in order to photograph object at different positions, the grip device comprising:
a rotation unit comprises: a rotation member; and a first rotation casing and a second rotation casing to enclose the rotation member; and
a grip unit having a rotational center of the rotation unit that is in the direction of a user and is aligned with a geometrical center of the rotation unit along a radial axis thereof that is parallel to the length axis of the main body in order not to coincide with the geometrical center of the rotation unit; and
a connection unit to connect the rotation unit to the main body so that the rotation unit is rotatable about the main body; and
a recording medium to record the video.

13. The image photographing apparatus of claim 12, wherein a rotational center of the grip device is eccentric from a geometrical center of at least one of the main body and the grip device toward the rear side of the main body in order not to coincide with the geometrical center thereof.

14. The image photographing apparatus of claim 12, wherein the main body forms a cylindrical shape with the grip device.

15. The image photographing apparatus of claim 12, wherein the grip device is rotatable between a first position having a rotation range of 0° to 20° for a high angle shot and a second position having a rotation range of 130° to 170° for a low angle shot.

16. The image photographing apparatus of claim 12, wherein a guide curved surface to guide the holding of the main body is provided in an upper side of the main body.

17. The image photographing apparatus of claim 12, wherein the display unit comprises:
a photographing button to input a capture signal.

18. The image photographing apparatus of claim 12, wherein the recording medium comprises:
a built-in semiconductor memory mounted in the main body to perform reading and writing operations, and a detachable semiconductor memory detachably mounted in the main body to perform reading and writing operations.

19. The image photographing apparatus of claim 18, further comprising:
a controller to control a signal exchange between the built-in semiconductor memory and the detachable semiconductor memory.

20. An image photographing apparatus, comprising:
a main body extending along a length axis between a front side and a rear side to define a length thereof; and
a grip device rotatably mounted in the main body and rotatable between first and second positions in order to photograph objects at different positions, the grip device comprising:
a rotation unit comprises: a rotation member; and a first rotation casing and a second rotation casing to enclose the rotation member; and
a grip unit having a rotational center of the rotation unit that is in the direction of a user and a connection unit to connect the rotation unit to the main body so that the rotation unit is rotatable about the main body,
wherein the rotational center of the grip device is eccentric to one side of the main body and is aligned with a geometrical center of the rotation unit along a radial axis thereof that is parallel to the length axis of the main body in order not to coincide with the geometrical center of the main body.

21. The image photographing apparatus of claim 20, wherein a lens unit is disposed in the front side of the main body to photograph an object, and
the rotational center of the grip device is eccentric from the geometrical center of the main body toward the rear side of the main body.

22. The image photographing apparatus of claim 21, wherein the rotational center of the grip device is eccentric from a geometrical center of the grip device toward the rear side of the main body.

23. A grip device rotatably connected to a main body of an image photographing apparatus extending along a length axis between a front side and a rear side to define a length thereof and having a lens unit disposed in the front side thereof, the grip device comprising:
a rotation unit comprises: a rotation member; and a first rotation casing and a second rotation casing to enclose the rotation member; and
a grip unit having a rotational center of the rotation unit that is in the direction of a user;
a connection unit rotatably connected to the main body to connect a rotation unit having a rotational center to the main body so that the rotational unit is rotatable about the main body; and
a casing to house the connection unit,
wherein the rotational center of the connection unit is in the direction of a user and rotates between a first position and a second position to rotate the grip device in order to photograph objects a different positions and is eccentric to the rear side of the main body and is aligned with a geometrical center of the rotation unit along a radial axis thereof that is parallel to the length axis of the main body in order not to coincide with the geometrical center of the main body.

24. The grip device of claim 23, wherein the rotational center of the connection unit is eccentric to the rear side of the main body in order not to coincide with a geometrical center of the connection unit.

25. An image photographing apparatus, comprising:
a main body having a body geometric center; and
a grip device rotatably mounted on the main body and having a grip geometric center and a rotational center,
wherein the body geometric center, the grip geometric center and the rotational center are arranged sequentially in a direction with respect to a side of the main body, and
wherein the grip device includes a rotation unit, the rotation unit comprising: a rotation member; and a first rotation casing and a second rotation casing to enclose the rotation member.

26. The image photographing apparatus of claim 25, wherein the grip device rotates about the rotational center to define a circumferential button operating range to allow a user to manipulate buttons disposed on the main body, and
wherein the rotational center is located in the center of the button operating range.

27. The image forming apparatus of claim 25, wherein the grip device comprises:

a rotational unit rotably mounted on the main body and having the grip geometric center and the rotational center; and a grip band disposed on the rotational unit to provide a space with the rotational unit to accommodate a user's hand.

28. The image forming apparatus of claim 27, wherein the body geometric center, the grip geometric center and the rotational center are located adjacent the grip band.

* * * * *